United States Patent [19]
Cuevas

[11] Patent Number: 5,382,046
[45] Date of Patent: Jan. 17, 1995

[54] AIR BAG MODULE INSTALLATION STRUCTURE AND METHOD

[75] Inventor: Jess A. Cuevas, Scottsdale, Ariz.

[73] Assignee: TRW Inc., Lyndhurst, Ohio

[21] Appl. No.: 660,566

[22] Filed: Feb. 25, 1991

[51] Int. Cl.$^6$ .............................................. B60R 21/22
[52] U.S. Cl. ............................... 280/728 A; 280/731
[58] Field of Search .............. 280/728, 731, 732, 741, 280/743; 403/322, 326, 344; 29/450

[56] References Cited

U.S. PATENT DOCUMENTS

| | | | |
|---|---|---|---|
| 1,251,927 | 1/1918 | Schneider | 24/111 |
| 1,255,877 | 2/1918 | Hawthorne | 362/375 |
| 1,996,109 | 2/1935 | Hiering | 153/1 |
| 2,350,651 | 6/1944 | Taubert et al. | 368/276 |
| 2,414,529 | 1/1947 | Ives | 220/315 |
| 2,554,078 | 5/1951 | Werner . | |
| 2,616,587 | 11/1952 | Petch | 220/319 X |
| 2,626,581 | 1/1953 | Almgren et al. | 413/27 |
| 2,725,252 | 11/1955 | Greer | 292/256.65 |
| 2,890,462 | 6/1959 | Ross | 4/636 |
| 3,104,905 | 9/1963 | Erdmann et al. | 292/256.6 |
| 3,120,402 | 2/1964 | Wallen | 285/305 |
| 3,302,221 | 2/1967 | Zysman . | |
| 3,534,466 | 10/1970 | Arnolino et al. | 29/509 |
| 3,661,235 | 5/1972 | Harrison | 188/218 |
| 3,680,884 | 8/1972 | Stephenson | 280/731 |
| 3,787,074 | 1/1974 | Lewis et al. | 280/731 |
| 3,819,205 | 6/1974 | Dunford et al. . | |
| 3,867,055 | 2/1975 | Wooden | 403/373 |
| 3,888,063 | 6/1975 | Frantz | 52/656 X |
| 3,923,407 | 12/1975 | Jensen et al. | 403/322 |
| 3,942,391 | 3/1976 | Barth et al. . | |
| 4,097,064 | 6/1978 | Ikawa et al. | 280/752 |
| 4,111,457 | 9/1978 | Kob et al. | 280/728 |
| 4,281,601 | 8/1981 | Overman | 403/326 |
| 4,325,568 | 4/1982 | Clark et al. . | |
| 4,442,586 | 4/1984 | Ridenour | 29/511 |
| 4,489,850 | 12/1984 | Reneau | 220/323 |
| 4,625,754 | 12/1986 | Wilson et al. | 137/315 |
| 4,629,893 | 12/1986 | Hanz et al. | 403/344 |
| 4,810,005 | 3/1989 | Fohl | 280/735 |
| 4,828,300 | 5/1989 | Agbay | 292/256.6 |
| 4,830,401 | 5/1989 | Honda . | |
| 4,835,850 | 6/1989 | Eckold et al. | 29/243.529 |
| 4,877,264 | 10/1989 | Cuevas | 280/731 |
| 4,902,036 | 2/1990 | Zarder et al. | 280/736 |
| 4,941,678 | 7/1990 | Lauritzen et al. | 280/732 |
| 4,988,119 | 1/1991 | Hartmeyer . | |
| 5,141,247 | 8/1992 | Barth | 280/728 |

FOREIGN PATENT DOCUMENTS

| | | | |
|---|---|---|---|
| 3545028 | 7/1987 | Germany | 280/743 |
| 0160756 | 6/1989 | Japan | 280/743 |

*Primary Examiner*—Karin L. Tyson
*Attorney, Agent, or Firm*—Calfee Halter & Griswold

[57] ABSTRACT

A structure and a method for installing a vehicle air bag module in a vehicle includes a coupling member, preferably an expansible retainer ring, having a form which can be mechanically changed (e.g. expanded). The air bag module has a coupling device adapted to engage a portion of the vehicle (e.g., the vehicle steering column) and to locate and align the module relative to the portion of the vehicle. The coupling member is then manipulated to engage both the coupling device of the module and the portion of the vehicle to couple the module with the vehicle.

22 Claims, 5 Drawing Sheets

AIR BAG MODULE INSTALLATION STRUCTURE AND METHOD

TECHNICAL FIELD

The present invention relates to a structure and to a method for installing a vehicle air bag module in a vehicle.

BACKGROUND

A vehicle air bag module typically includes an air bag and an inflator disposed within a container. The container comprises a reaction device (e.g., a reaction can or a reaction plate) and a cover coupled to the reaction device to complete an enclosure for the inflator and the air bag. The module is assembled by coupling the air bag and inflator to the reaction device, and then coupling the cover to the reaction device. The module is installed in a vehicle by coupling the reaction device to a structural part of the vehicle, e.g., the steering column.

At the onset of a vehicle collision, the inflator rapidly generates an inert, non-toxic gas, and directs that gas into the air bag. The gas forces the air bag through the cover and inflates the air bag. During inflation of the air bag, the inflator and the air bag apply significant forces to the reaction device. Those forces are, in turn, taken up and transmitted to the vehicle by (i) the reaction device, (ii) the structure which couples the inflator and the air bag to the reaction device, and (iii) the structure which couples the reaction device to the vehicle.

An old and well known technique for installing an air bag module in a vehicle is to bolt or rivet the air bag module to a structural portion of a vehicle. Specifically, a plurality of bolts or rivets are used to attach the reaction device of the module to a structural part of the vehicle. U. S. Pat. Nos. 4,000,010, 4,097,064 and 4,810,005 disclose various examples of air bag modules adapted to be bolted or riveted to a structural part of a vehicle. In order to bolt or rivet the module to a vehicle, bolt or rivet holes or other structure on the module must first be aligned with the bolt or rivet holes or other structure on the part of the vehicle to which the module is being attached. The module is then attached to the vehicle by sequentially installing the bolts or the rivets.

SUMMARY OF THE INVENTION

The present invention provides a new and useful structure and method for installing an air bag module in a vehicle. The structure and the method are designed to enable the module to be simply and efficiently installed in a vehicle, without fasteners such as bolts or rivets. The structure and the method require relatively few parts, and are believed to be less time consuming to use than bolts or rivets. Moreover, the structure and technique are particularly well suited for locating and installing air bag modules in vehicles by mass production methods.

According to one aspect the invention, an air bag module has coupling structure integrally connected with a portion of the module. A coupling member has a form which is mechanically changed so as to bring the coupling member into engagement with the coupling structure on the module and a portion of the vehicle, thereby to couple the module to the vehicle. Preferably, the coupling member is an expansible retaining ring which is engaged with a portion of the vehicle and which is expanded into engagement with the coupling structure on the module, thereby to couple the module with the vehicle.

According to another aspect of the invention, the coupling structure on the module is designed to be received in a cradle formed by a portion of the vehicle. The cradle supports and locates the module such that the module can be quickly and efficiently coupled with the vehicle. According to the preferred embodiment, the cradle is formed at the end of a steering column, and the coupling structure is designed to be received in the cradle. The coupling structure and cradle cooperate to locate the module on the end of the steering column in a convenient position to be coupled to the vehicle by expansion of the retaining ring.

Further features of the present invention will become apparent from the following detailed description and the accompanying drawings.

DETAILED DESCRIPTION OF THE PREFERRED EMBODIMENT

As described above, the present invention relates to a structure and a method for coupling an air bag module to a vehicle. The structure and method described below are designed to couple an air bag module to the driver side of a vehicle. However, it will be clear to those of ordinary skill in the air bag art that similar concepts can be used to couple an air bag module to the passenger side of a vehicle.

Figure 1:
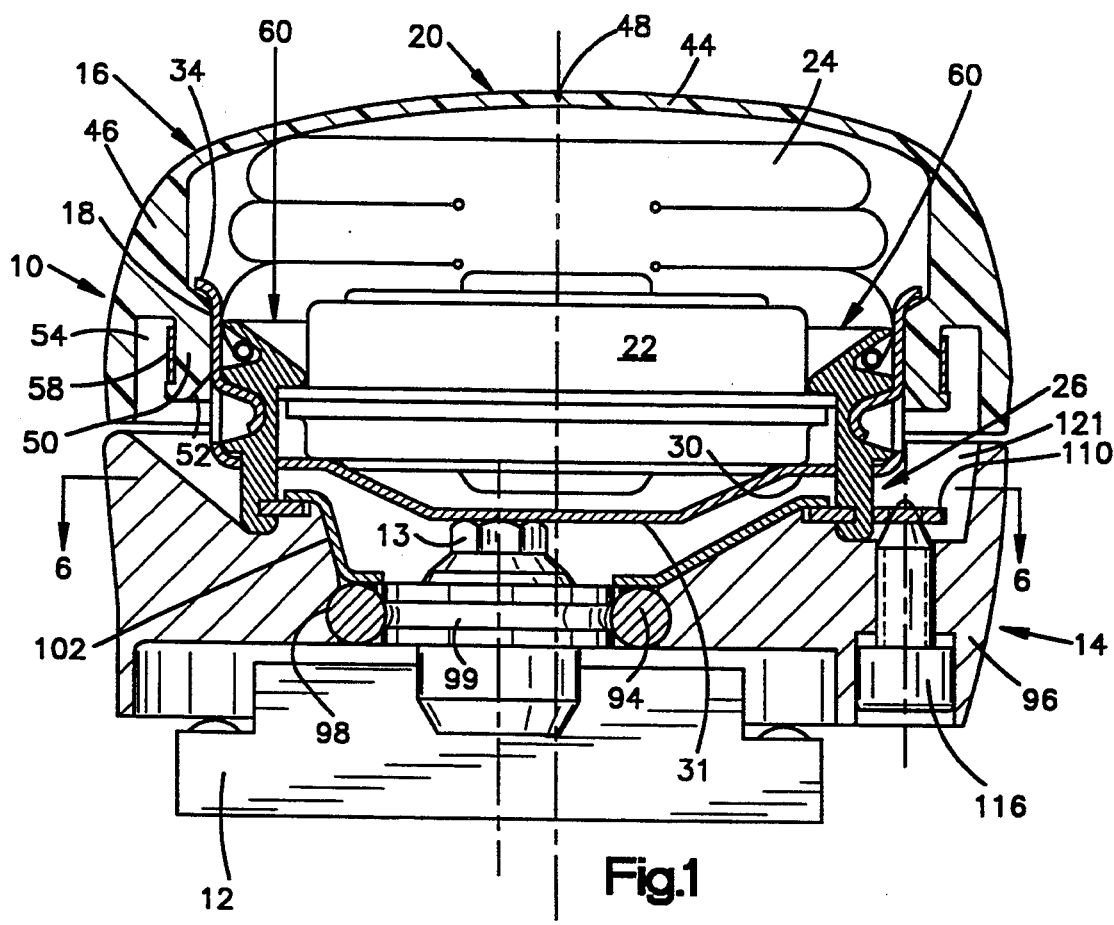
FIG. 1 is a sectional illustration of an air bag module coupled to a vehicle steering column, according to the principles of the invention.
Figure 2:
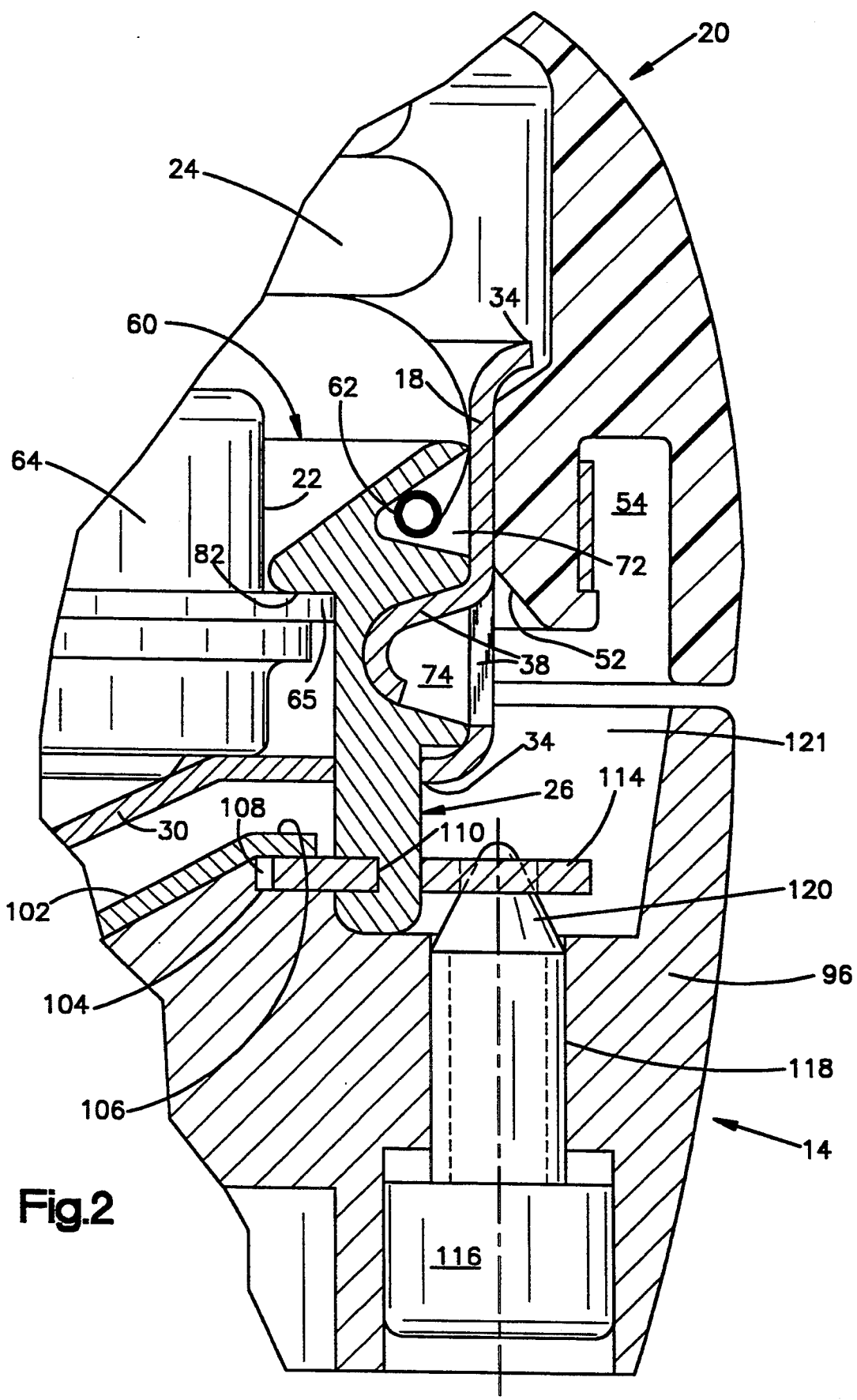
FIG. 2 is an enlarged, sectional view of a fragmentary portion of an air bag module coupled to a vehicle steering column, according to the principles of the invention.
Figure 3:
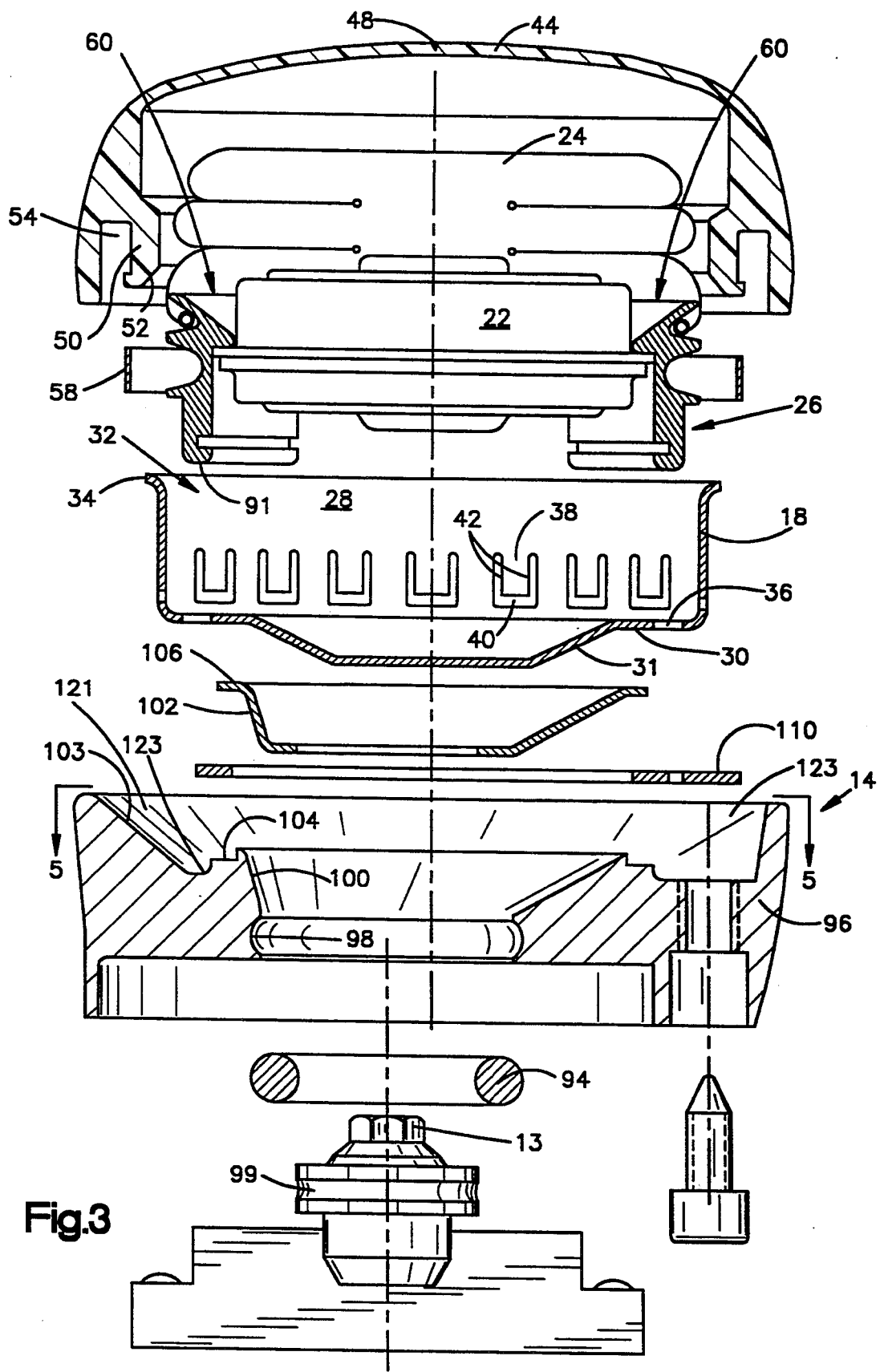
FIG. 3 is an exploded view of components for forming an air bag module and for coupling the module to a vehicle steering column.

As shown in FIGS. 1-3, an air bag module 10 is located at the upper end of a vehicle steering column 12. The air bag module 10 is located above the wheel nut 13 which couples the steering wheel (not shown) to the upper portion 14 of the steering column.

The air bag module 10 is preferably formed in accordance with a concurrently filed and commonly owned application of Jess Cuevas entitled, "Air Bag Module Structure and Method of Assembly", Ser. No. 661,102, filed Feb. 25, 1991. The module 10 includes a container 16 formed by a cup-shaped housing member 18 and a cover, indicated generally at 20. The container 16 is adapted to be coupled to the upper portion 14 of the vehicle steering column to install the moldule 10 in a vehicle. An inflator 22 and an air bag 24 are disposed in the container 16. A retainer member 26 (FIGS. 1-5) is disposed in the housing member 18. The retainer member 26 is coupled to the housing member 18, and cooperates with the housing member 18 to maintain the inflator 22 and the air bag 24 coupled with the housing member 18.

The cup-shaped housing member 18 is preferably formed of 6061-T6 aluminum. The housing member 18 has an annular sidewall 28 and a bottom wall 30 formed in one piece with the side wall 28. The bottom wall 30 includes a frusto-conical central portion 31. Together the side wall 28 and the bottom wall 30 define a cavity, indicated generally at 32 (FIG. 3), for receiving the inflator 22 and a portion of the air bag 24. The housing member 18 has a radially outwardly extending flange 34 extending circumferentially around the top end of the side wall 28.

The bottom wall 30 of the housing member 18 includes a series of arcuate openings 36. (FIGS. 2,3) The centers of the arcuate openings 36 are spaced apart from each other by about 120°. The annular side wall 28 also includes a plurality of bendable locking tabs 38. The locking tabs 38 are generally rectangular in shape, and each tab has a free end 40 and a pair of sides 42. The locking tabs 38 are cut from the material of the side wall 28 and are adapted to be bent inward from the annular side wall 28.

The module cover 20 is preferably formed of a tough, flexible plastic such as polypropylene. The cover 20 includes a circular front portion 44 and an annular side portion 46. The front portion 44 has a designed weakness (e.g., one or more V-shaped grooves 48) which enables the front portion 44 to rupture to enable the air bag 24 to be forced through the cover 20 during deployment of the air bag 24.

The side portion 46 of the cover includes an annular wall 50 dimensioned to fit tightly around the housing member 18 when the cover is assembled with the housing member. The wall 50 has a ramp 52 at its lower end on a radially inner surface of the wall. An annular slot 54 is formed in the lower end of the wall 50 at a position radially outward of the ramp 52. The slot 54 permits the ramp 52 and the adjacent portion of the wall 50 to flex outwardly.

The cover 20 is assembled with the housing member 18 by pressing the cover downward onto the housing member. As the cover 20 is pressed downward, the ramp 52 on the cover engages the flange 34 on the housing member 18. The ramp 52 and the adjacent portion of the annular wall 50 flex outward to enable the wall to encircle the housing member 18. The annular slot 54 is dimensioned to receive a band 58 which can be tightened against the annular wall 50 to maintain the cover 20 coupled with the housing member 18.

The air bag 24 is conventional in design and is formed from nylon or other flexible fabric. The air bag 24 includes an annular mouth 60, defining a gas inlet opening through which gas can be directed into the air bag. As shown in FIG. 2, the mouth 60 of the air bag includes a relatively thick bead 62, preferably formed by stitching a portion of the air bag fabric around a nylon cord (not shown). The bead 62 reinforces the mouth 60 of the air bag 24, and is useful in coupling the mouth of the air bag 24 to the housing member 18. The air bag 24 is initially prefolded and is coupled to the housing member 18 as a prefolded air bag unit. When coupled to the housing member 18, the bulk of the prefolded air bag unit is located outside of the housing member 18.

The inflator 22 comprises a substantially cylindrical housing 64 (FIG. 3) with an annular, outwardly extending flange 65. The housing 64 encloses a gas generant, a filter structure and an ignitor device (not shown). At the onset of a collision, the ignitor is activated and ignites the gas generant. The gas generant rapidly generates an inert, non-toxic gas (e.g., nitrogen) which is filtered and then directed through gas dispensing nozzles (not shown) in the inflator housing 64. The gas generant can be of any suitable formulation, including the formulations disclosed in Pietz, U.S. Pat. No. 3,895,098. Similarly, the filter structure can be of any known construction, including that shown in Zander, et al, U.S. Pat. No. 4,902,036, which is a preferred construction.

Figure 4:
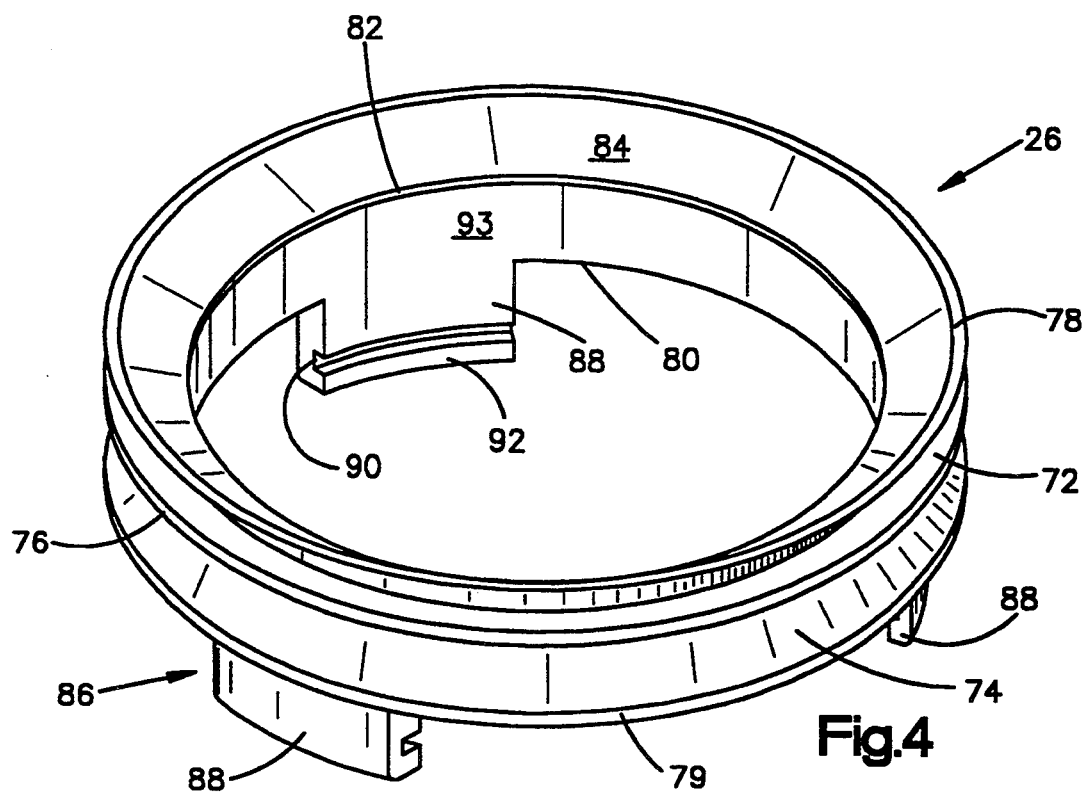
FIG. 4 is a perspective illustration of a retainer member for use in forming the air bag module of FIGS. 1-3.
Figure 5:
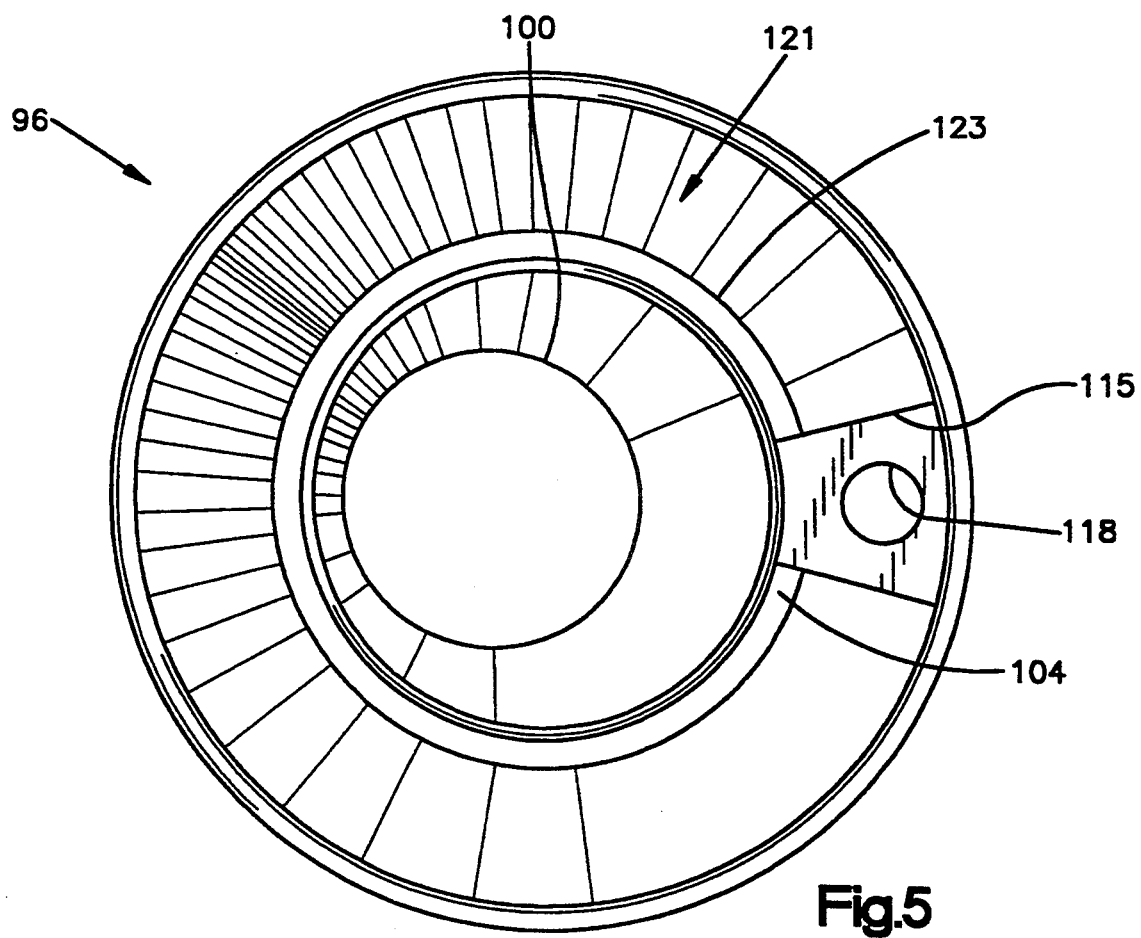
FIG. 5 is a view of one of the components of FIG. 3, taken from the direction 5—5, with portions omitted.

Both the air bag 24 and the inflator 22 are coupled with the housing member 18 by the retainer member 26. The retainer member 26 is formed from relatively rigid material (e.g., steel, forged aluminum) and, as shown in FIG. 4, is annular in shape. The retainer member 26 includes an annular wall 93 with a radially outer surface 76 that is dimensioned for a relatively tight fit in the cavity 32 against the wall 28 of the housing member 18 (FIG. 3). An annular air bag recess 72 and an annular locking recess 74 are formed in the radially outer surface 76 of the retainer member 26. The air bag recess 72 is formed near the top end 78 of the retainer member 26. The locking recess 74 is formed near the lower end 79 of the retainer member 26. Moreover, the lower end 79 of the retainer member 26 includes a radially extending, annular bottom surface 80. The retainer member 26 has an annular, inwardly projecting lip 82 formed by the radially inner surface 84 and the retainer member wall 93. The lip 82 has an inner diameter that is smaller than the outer diameter of the flange 65 of the inflator 22. The portion of the inner wall 93 below the lip 82 has a diameter substantially the same as the outer diameter of the inflator housing 64.

A coupling device, indicated generally at 86, is formed in one piece with the retainer member 26. The coupling device 86 comprises three coupling members 88, each extending axially away from the bottom surface 80 of the retainer member 26. Preferably, the centers of the coupling members 88 are disposed 120° apart from each other. Each coupling member 88 includes a distal end 92 having a rounded surface 91 (FIG. 3). Moreover, each coupling member 88 has a locking groove 90 formed adjacent the distal end 92 of the coupling member. The locking grooves 90 face radially inward with respect to the annular inner wall 93. Thus, the coupling members 88 may be considered locking members. The coupling members 88 are located and dimensioned to extend through the arcuate openings 36 in the bottom wall 30 of the housing member 18 when the retainer member 26 is inserted into the housing member 18. When the retainer member 26 is coupled to the housing member 18 to form the module 10, the coupling members 88 extend out of the housing member 18 and away from the module 10.

As shown in FIGS. 1–3, the upper portion 14 of the steering column includes coupling structure including the wheel nut 13, a spoke ring 94, and a shroud 96. The shroud 96 is annular in shape. The radially inner surface of the shroud includes an upper frusto-conically shaped surface portion 100 and a lower surface portion defining an annular recess 98. The spoke ring 94 is adapted to fit into the annular recess 98 in the shroud 96 and a corresponding recess 99 in the wheel nut 13 to secure the shroud 96 to the wheel nut 13. The frustro-conically shaped surface portion 100 of the shroud 96 is adapted to receive a frusto-conically shaped bracket 102. The bracket 102 is welded to the wheel nut 13 and to the spoke ring 94.

The top surface 103 (FIG. 4) of the shroud defines an annular stepped portion 104 surrounded by an annular trough 123. The annular stepped portion 104 cooperates with an annular radially extending flange 106 at the top of the bracket 102 to form a groove 108 (FIG. 2). The groove 108 is adapted to receive a coupling member which in the preferred and illustrated embodiment is an expansible retaining ring 110. More particularly, the groove 108 is adapted to receive the inner portion of the expansible retaining ring 110.

Figure 6:
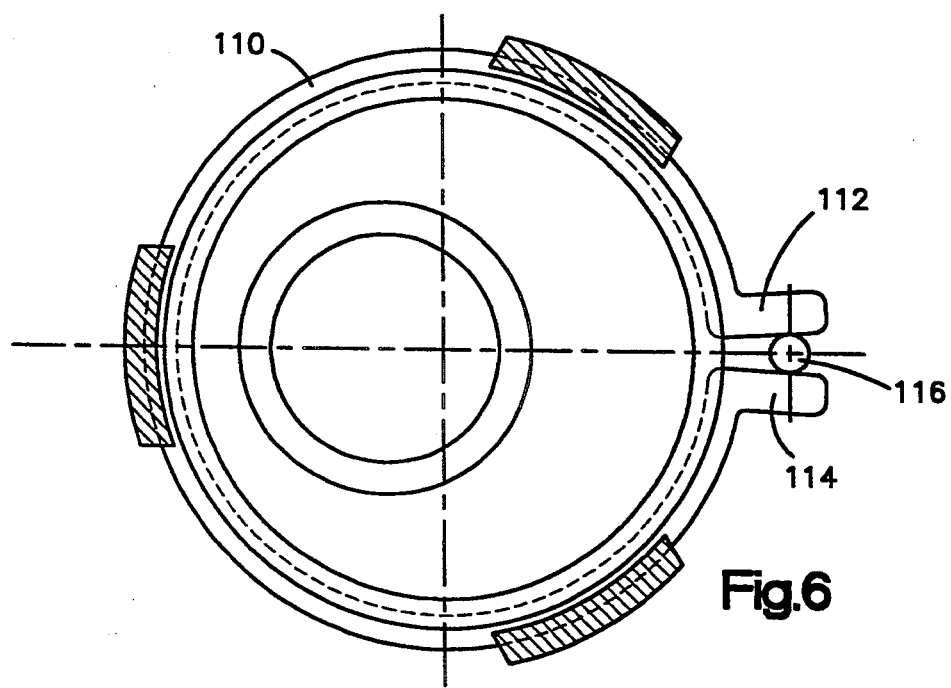
FIG. 6 is a sectional view of the structure of FIG. 1, taken along the line 6—6, with portions omitted, and illustrating the expansible locking ring securing the module to a vehicle.

The expansible retaining ring 110 is generally annular in shape and is preferably formed from stainless steel or similar material. The retaining ring 110 is split, and has two closely spaced tabs 112,114 (FIGS. 2, 6) formed in one piece with the ends of the retaining ring 110. The tabs 112, 114 project radially outward from the annulus of the retaining ring 110. The shroud 96 has a radially extending slot 115 (FIG. 5), and the tabs 112, 114 on the retaining ring 110 are located so as to extend through the slot 115.

The tabs 112, 114 on the retaining ring 110 are adapted to be forced apart, to increase the circumference of the annulus of the retaining ring 110. Specifically, a spreader screw 116 is disposed in a threaded bore 118 formed in the shroud 96. Rotating the spreader screw 116 in one direction within the threaded bore 118 moves a conically-shaped tip 120 of the spreader screw 116 axially in a direction which forces the tabs 112, 114 apart and thereby increases the annulus of the retaining ring 110.

Radially outward of the trough 123, the top surface 103 of the shroud 96 also defines a substantially annular, conical outer surface 121. The trough 123 is disposed at the bottom of the conical surface 121 and has a rounded profile which matches the rounded surfaces 91 at the distal ends 92 of the coupling members 88. The conical surface 121 and the trough 123 combine to form a cradle for receiving the coupling members 88, as described more fully below.

In assembling the air bag module 10, the inflator 22 is inserted into the cavity 32 in the housing member 18 so that the inflator rests on the bottom wall 30 of the housing member 18, as shown in FIGS. 2,3. The bead 62 at the mouth of the air bag is forced over the top end 78 of the retainer member 26 and into the air bag recess 72. Then, the retainer member 26, with the bead 62 of the air bag disposed in the air bag recess 72, is inserted into the housing member 18. The retainer member 26 is positioned in the housing member 18 such that the coupling members 88 extend through the arcuate openings 36 in the bottom wall 30 of the housing member 18. In addition, the bottom surface 79 on the retainer member 26 rests on the bottom wall 30 of the housing member 18.

As the retainer 26 is inserted into the housing member 18, the bead 62 on the air bag 24 is captured between the air bag recess 72 and the annular side wall 28 of the housing member 18. Moreover, the internal lip 82 on the retainer member 26 engages the top of the flange 65 on the inflator 22. The inflator 22 is thus captured and positioned in the housing member 18 by the lip 82 and the bottom wall 30. Additionally, the annular locking recess 74 in the retainer member 26 is aligned with the bendable locking tabs 38 extending circumferentially around the housing member 18.

As it is inserted into the housing member, the retainer member 26 aligns the inflator 22 within the cavity 32 in the housing member 18. Specifically, the retainer member 26 is aligned in the cavity 32 by (i) the coupling members 88 which extend through the arcuate openings 36 in the housing member 18 and (ii) the tight fit between the annular wall 93 of the retainer member 26 and the side wall 28 of the housing member. Moreover, as discussed above, the inflator 22 is aligned in the retainer member 26 by (i) the engagement of the lip 82 on the retainer member with the flange 65 on the inflator and (ii) the close fit between the inflator housing 64 and the inner surface 84 of the retainer member wall 93.

Figure 7:
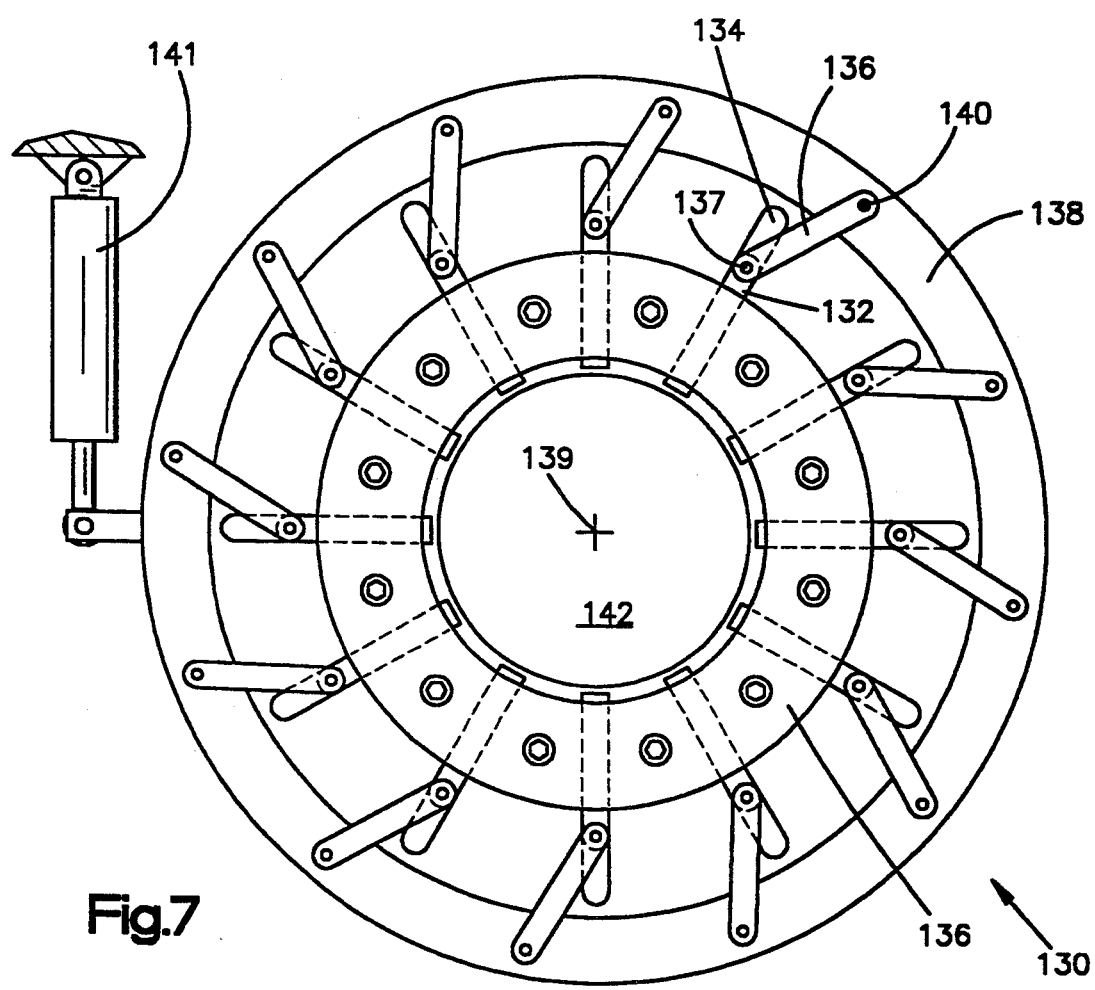
FIG. 7 is a top plan view of crimping apparatus for use in assembling an air bag module.

After the retainer member 26, the inflator 22 and the bead 62 at the mouth of the air bag 24 are located and aligned within the housing member 18, the retainer member 26 is secured to the housing member. Preferably, a crimping machine 130 (FIG. 7) is used to bend all of the locking tabs 38 in the side wall 28 of the housing member 18 simultaneously into the locking recess 74 in the retainer member 26.

The crimping machine 130 includes an annular array of radially extending crimp rods 132. Each crimp rod 132 is received within a guide slot 134 in a stationary inner annular plate 135. The radially inner end of each crimp rod 132 is adapted to engage and bend a respective locking tab 38 into the locking recess 74 in the retainer member 26. The radially outer end of each crimp rod 132 is pivotally connected to the radially inner end of a respective link 136 by means of a bolt 137 or similar fastener. The radially outer end of each link 136 is pivotally attached to an annular pivot plate 138 by a fastener 140. The pivot plate 138 is pivotally mounted about a central axis 139 and is adapted to be pivoted in opposite directions about the axis 139 by an air cylinder 141 or similar device.

The housing member 18, together with the retainer member 26, inflator 22 and air bag 24, is inserted into an opening 142 in the center of stationary inner plate 135. The pivot plate 138 is pivoted in one direction by the air cylinder 141, to force the crimp rods 132 radially inward and against their respective locking tabs 38. As the crimp rods 132 are forced inward, the locking tabs 38 are simultaneously crimped (bent) into the locking recess 74 in the retainer member 26. After the locking tabs 38 are bent into the locking recess 74, the air cylinder 141 reaches the end of its stroke. The air cylinder 141 then reverses the pivotal direction of plate 138, to draw the crimp rods 132 away from the locking tabs 38. The housing member 18, to which the retainer member 26, inflator 22 and air bag 24 are now secured, is then removed from the crimping machine 130.

After the retainer member 26, inflator 22 and air bag 24 have been coupled to the housing member 18, cover 20 is coupled to the housing member to complete the module 10. Specifically, the cover 20 is pressed downwardly over the air bag 24 and onto the housing member 18. As discussed above, when the cover 20 is pressed onto the housing member 18, the ramp 52 and the adjacent portion of the annular wall 50 of the cover flex radially outward to enable the cover to be inserted over the flange 34 of the housing member 18. The annular wall 50 snaps back into place after it has passed over the flange 34. The band 58 of sheet metal is then inserted into the slot 54 in the annular wall 50 and pulled to a predetermined tension to lock the cover 20 securely to the housing member 18, thereby to complete the module 10.

After the cover 20 is attached, the air bag module 10 is coupled with the steering column of the vehicle, using the structure and method of the present invention. Specifically, the expansible retaining ring 110 is located in the shroud 96, with (i) the radially inner portion of the retaining ring 110 located in the annular groove 108 formed between the bracket 102 and the shroud 96 and (ii) the tabs 112, 114 on the retaining ring extending into the slot 115 in the shroud 96 and disposed about the spreader screw 116. The air bag module 10 is positioned on top of the steering column with (i) the rounded ends 91 of the coupling members 88 received in the cradle formed by the conical surface 121 and the trough 123 of the shroud and (ii) the frustro-conical portion 31 of the bottom wall of the housing member 18 located in the frusto-conically shaped bracket 102. The cradle functions to support and locate the coupling members 88, and thereby the module 10, in a predetermined orientation on the steering column.

When the module 10 is supported by the cradle, the expansible retaining ring 110 is aligned with the locking grooves 90 adjacent the distal ends 92 of the coupling members 88. The retaining ring 110 is then expanded by rotating spreader screw 116. As the diameter of the retaining ring 110 increases, the radially inner portion of the retaining ring remains engaged with the groove 108 but the radially outer portion of the retaining ring 110 is forced into engagement with the locking grooves 90 in the coupling members 88. Thus, the retaining ring 110 couples the module 10 to the steering column of the vehicle.

In the foregoing preferred embodiment, the coupling members 88 are formed in one piece with the retainer member 26 and extend away from the housing member 18. However, it is also contemplated that the coupling members could be formed in one piece with the housing member, rather than with the retainer member. The housing member would then be coupled to the steering column by means of the retainer ring 110.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the present invention. Accordingly, the foregoing detailed description should be exemplary in nature and not as limiting to the scope and spirit of the invention set forth in the appended claims.

What is claimed is:

1. Apparatus comprising a vehicle airbag module, said vehicle airbag module comprising an airbag, an airbag inflator, and an airbag retaining member, and a coupling member for coupling said airbag retaining member of said vehicle airbag module with a portion of a vehicle;

said coupling member being attached to a portion of a vehicle and mechanically changeable from a first configuration to a second configuration to thereby manipulate said coupling member into engagement with said retaining member of the airbag module to thereby couple the module with the portion of the vehicle.

2. Apparatus as set forth in claim 1, wherein said coupling member is mechanically expandable from said first configuration to said second configuration.

3. Apparatus for coupling a vehicle air bag module with a portion of the vehicle, comprising:

a coupling device integral with the module; and a retaining ring with an annulus said retaining ring having a form which is expansible into engagement with one of the portion of the vehicle and the coupling device to couple the module with the portion of the vehicle;

wherein the portion of the vehicle has an annular locking groove, said coupling device comprises a locking member extending away from the module and having a locking groove, and said retaining ring has a form which can be disposed in the locking groove in the vehicle and is expanded into the locking groove in said locking member to couple the locking member to the vehicle.

4. Apparatus as set forth in claim 3, further including a spreader member engaged with the retaining ring, said spreader member having a configuration which is selectively moveable relative to said retaining ring.

5. Apparatus comprising a vehicle air bag module, a vehicle steering column, and a coupling member for coupling said air bag module to said vehicle steering column;

said module including an integral coupling device said steering column including coupling structure at an upper end of said vehicle steering column;

said coupling member being interposed between the coupling structure and the coupling device;

said coupling member having a configuration which is manipulatable into engagement with the coupling structure and the coupling device to couple the module to the coupling structure;

said coupling structure and said coupling device having respective portions which engage each other in a manner which locates the module in a predetermined orientation in the steering column.

6. Apparatus as set forth in claim 5, wherein said coupling device comprises at least one locking member extending away from the module, and said coupling structure has a portion which supports the locking member and which radially aligns the coupling device and the module relative to the steering column.

7. Apparatus for coupling a vehicle air bag module to the upper end of a vehicle steering column, comprising:

a coupling device integral with the module;

coupling structure at the upper end of the vehicle steering column; and a coupling member interposed between the coupling structure and the coupling device and having a configuration which can be manipulated into engagement with the coupling structure and the coupling device to couple the module to the coupling structure, said coupling structure and said coupling device having respective portions with a configuration to engage each other into a manner which locates the module in a predetermined orientation in the steering column;

wherein said coupling device comprises at least one locking member extending away from the module, and said coupling structure has a portion with a configuration to support the locking member and to align the coupling device and the module relative to the steering column;

wherein said coupling member has a configuration which is expansible into engagement with a groove formed in the coupling device.

8. Apparatus for coupling a vehicle air bag module to the upper end of a vehicle steering column, comprising:
- a coupling device integral with the module, said coupling device comprising at least one locking member extending away from the module;
- coupling structure at the upper end of the vehicle steering column, said coupling structure having a portion with a configuration to support the locking member and to align the coupling device and the module relative to the steering column; and
- a retaining ring with an annulus which is enlarged with the coupling structure at the upper end of the steering column and which has a configuration which is expansible into engagement with the coupling device to couple the module to the upper end of the vehicle steering column to locate the module in a predetermined orientation on the steering column;
- wherein the coupling structure at the upper end of the vehicle steering column comprises an annular locking groove, said locking groove forming said locking device having a locking groove, and said retaining ring having a configuration which is expansible into the locking groove in said locking member, to couple the module to the upper end of the vehicle steering column.

9. A method of installing a vehicle air bag module in a vehicle comprising the steps of:
- locating a coupling member in the vehicle and engaging the coupling member with a portion of the vehicle;
- locating the module in the vehicle in a predetermined orientation relative to the vehicle, said module having an integral coupling device; and
- mechanically expanding the coupling member into engagement with the coupling device of the module to couple the module to the vehicle.

10. A method of installing a vehicle air bag module in a vehicle comprising the steps of:
- locating an expansible retaining ring in the vehicle and engaging the expansible retaining ring with a portion of the vehicle;
- locating the module in the vehicle in a predetermined orientation relative to the vehicle, said module having an integral coupling device; and
- mechanically expanding the retaining ring into engagement with the coupling device of the module to couple the module to the vehicle;
- wherein the vehicle has a steering column, and the step of locating the module in the vehicle comprises the step of locating the module at an upper end of the vehicle steering column;
- wherein said steering column defines a cradle at its upper end, the coupling device of the module comprises a plurality of members integral with and extending away from the module, and the step of locating the module in the vehicle comprises the step of locating the members in the cradle formed at the upper end of the steering column.

11. Apparatus comprising a vehicle air bag module, and a coupling member for coupling said vehicle air bag module with a portion of a vehicle;
- said module including an integral coupling device;
- said coupling member comprising a retaining ring with an annulus, said retaining ring having a form which is expansible into engagement with one of the portion of the vehicle and the coupling device to couple the module with the portion of the vehicle.

12. Apparatus comprising a vehicle airbag module, and a coupling member for coupling said airbag module to a vehicle steering column;
- said module including a container and a coupling device integral with said container;
- said coupling device comprising at least one locking member extending away from said container;
- a coupling structure mountable upon a steering column at the upper end of a vehicle steering column;
- said coupling structure having a portion which supports the locking member and which aligns the module relative to the steering column; and
- said coupling structure comprising a retainer ring with a annulus which is engaged with the coupling structure at the upper end of the steering column and which is expanded into engagement with the coupling device to couple the module to the upper end of the vehicle steering column and to locate the module in a predetermined orientation on the steering column.

13. A method of installing a vehicle air bag module in a vehicle comprising the steps of:
- locating an expansible retaining ring in the vehicle and engaging the expansible retaining ring with a portion of the vehicle;
- locating the module in the vehicle in a predetermined orientation relative to the vehicle, said module having an integral coupling device; and
- mechanically expanding the retaining ring into engagement with the coupling device of the module to couple the module to the vehicle.

14. A method as set forth in claim 13, wherein the vehicle has a steering column, and the step of locating the modulo in the vehicle comprises the step of locating the module at an upper end of the vehicle steering column.

15. Apparatus for coupling a vehicle air bag module to the upper end of a vehicle steering column, comprising:
- a coupling device integral with the module;
- coupling structure at the upper end of vehicle steering column; and
- a coupling member interposed between the coupling structure and the coupling device and having a configuration which can be manipulated into engagement with the coupling structure and the coupling device to couple the module to the coupling structure;
- said coupling structure and said coupling device having respective portions with a configuration to engage each other into a manner which locates the module in a predetermined orientation in the steering column;
- said coupling structure having a portion with a configuration to support the locking member and to align the coupling device and the module relative to the steering column;
- said coupling structure including a substantially annular cradle; and
- said coupling device comprising a plurality of locking members extending away from the module, each locking member having a distal-end having a configuration to fit into the cradle at the upper end of said steering column.

16. Apparatus as set forth in claim 7 wherein said coupling structure includes a substantially annular cradle, said coupling device comprising a plurality of locking members extending away from the module, each locking member having a distal-end having a configuration to fit into the cradle at the upper end of said steering column.

17. Apparatus for coupling a vehicle air bag module to the upper end of a vehicle steering column, comprising:
   a coupling device integral with the module, said coupling device comprising at least one locking member extending away from the module;
   coupling structure at the upper end of the vehicle steering columns said coupling structure having a portion with a configuration to support the locking member and to align the coupling device and the module relative to the steering column; and
   a retaining ring with an annulus which is engaged with the coupling structure at the upper end of the steering column and which has a configuration which is expansible into engagement with the coupling device to couple the module to the upper end of the vehicle steering column to locate the module in a predetermined orientation on the steering column;
   wherein said coupling structure includes a substantially annular cradle, said coupling device comprising a plurality of locking members extending away from the module, each locking member having a distal-end having a configuration to fit into the cradle at the upper end of said steering column.

18. Apparatus as set in claim 8 wherein said coupling structure include a substantially annular cradle, said coupling device comprising a plurality of locking member extending away from the module, each locking member having a distal-end having a configuration to fit into the cradle at the upper end of said steering column.

19. Apparatus as set forth in claim 17 further including a spreader member engaged with the retaining ring being selectively movable relative to said retaining ring to expand the annulus of said retaining ring.

20. Apparatus as set forth in claim 18 further including a spreader member engaged with the retaining ring being selectively movable relative to said retaining ring to expand the annulus of said retaining ring.

21. Apparatus as set forth in claim 15 further including a retainer ring and a spreader member engaged with the retaining ring, the spreader member being selectively movable relative to said retaining ring to expand the annulus of said retaining ring.

22. Apparatus as set forth in claim 16 further including a retaining ring and a spreader member engaged with the retaining ring being selectively movable relative to said retaining ring to expand the annulus of said retaining ring.

* * * * *